United States Patent [19]

Tanaka

[11] Patent Number: 5,614,768
[45] Date of Patent: Mar. 25, 1997

[54] ENGINE CONTROL DEVICE FOR CONTROLLING THE OUTPUT POWER OF AN ENGINE OPERATING UNDER VARYING ELECTRIC LOAD CONDITIONS

[75] Inventor: Toru Tanaka, Hyogo, Japan

[73] Assignee: Mitsubishi Denki Kabushiki Kashia, Tokyo, Japan

[21] Appl. No.: 433,204

[22] Filed: May 2, 1995

[30] Foreign Application Priority Data

Nov. 9, 1994 [JP] Japan .................................. 6-275097

[51] Int. Cl.$^6$ ...................................................... H02P 9/04
[52] U.S. Cl. ........................................ 290/40 C; 290/40 R
[58] Field of Search .............................. 290/40 R, 40 A, 290/40 B, 40 C; 322/19, 22, 23, 27, 29; 123/339.1, 339.14, 339.16, 339.18

[56] References Cited

U.S. PATENT DOCUMENTS

| | | | |
|---|---|---|---|
| 4,633,093 | 12/1986 | Otobe et al. | 290/40 R |
| 4,649,878 | 3/1987 | Otobe et al. | 123/339.18 |
| 4,661,760 | 4/1987 | Goto et al. | 322/27 |
| 4,877,273 | 10/1989 | Wazaki et al. | 290/40 C |

FOREIGN PATENT DOCUMENTS

| | | |
|---|---|---|
| 36481 | 2/1991 | Japan . |
| 378535 | 4/1991 | Japan . |
| 347445 | 5/1991 | Japan . |

Primary Examiner—Steven Stephan
Assistant Examiner—Christopher Cuneo
Attorney, Agent, or Firm—Sughrue, Mion, Zinn, Macpeak & Seas

[57] ABSTRACT

An engine control device comprises generation current detecting means for detecting generation current of the generator, current value fluctuation removing means for removing the fluctuation of the output of the generation current detecting means, and correction quantity calculating means for calculating the correction quantity of intake gas into said engine in accordance with the output of the current fluctuation removing means.

4 Claims, 10 Drawing Sheets

ENGINE CONTROL DEVICE FOR CONTROLLING THE OUTPUT POWER OF AN ENGINE OPERATING UNDER VARYING ELECTRIC LOAD CONDITIONS

BACKGROUND OF THE INVENTION

1. Field of the Invention

The present invention relates to an engine control device for controlling output power of the engine in accordance with an amount of the electric load of the engine.

2. Description of the Related Art

With respect to such engine control device, for example, an engine control device is proposed in Unexamined Japanese Utility Model Publication (Kokai) No. 3-47445. In the engine control device, the duty ratio of a power transistor, which controls the supply of current in the field of the alternator and a revolution speed of the engine. An output current corresponding to an amount of the electric load of the alternator is estimated based on the detected duty ratio of a power transistor and the revolution speed of the engine. An intake of gas for the engine is increased by a quantity corresponding to the load quantity of electricity by driving an actuator so that the power of the engine is increased.

Consequently, even if the load of electricity is given, a battery can be controlled to a desired voltage and reduction in the revolution speed of engine due to supply of the load can be prevented.

However, even if actual load quantity of electricity is constant in a conventional device, the duty ratio of a power transistor may be changed. This change is derived from the delay of operation of the above-mentioned power transistor and the instability of power supply.

Thus, if duty ratio is changed, it is determined as the change of the load quantity of electricity. Accordingly, the intake of the gas is changed, and hunting of the rotation of engine and life reduction of an actuator disadvantageously occur.

Conventionally, the field current is controlled to keep the voltage of a battery to a desired value. Even the voltage drop of the battery due to the external factor, for example, the temperature drop of the battery etc., the field current is increased. The intake quantity of gas is also increased by the corresponding value of increment of the field current so that the output of engine increases.

Therefore, the output of engine is sometimes increased in spite of no load supply by an operator. In this case, the operator is unnecessary worried.

Further, a determination of idling up or idling down is carried out according to the duty ratio of a power transistor in order to change a target revolution speed of engine. Therefore, the fear of the repeat of the idling up or the idling down has occurred by particular operation states. Further, the idling up or the idling down is carried out in accordance with ON/OFF of intermittent load so that the rotation of engine might become unstabilized.

SUMMARY OF THE INVENTION

The object of the present invention is to solve the above-mentioned problems and provide an engine control device in which the operation of the engine control device is stabilized to improve the reliability.

The present invention provides an engine control device for controlling output power of an engine in accordance with an amount of the electric load to which a current is supplied from a generator driven by the engine, the engine control device comprising: generation current detecting means for detecting generation current of the generator; current value fluctuation removing means for removing a fluctuation from output signal of the generation current detecting means; correction quantity calculation means for calculating a correction quantity of intake gas into the engine in accordance with output signal of the current fluctuation removing means; aimed revolution speed control means for setting an aimed revolution speed of the engine in accordance with information of the engine and for calculating quantity of intake gas into the engine to control the revolutions of the engine to the aimed revolution speed; and adjusting means for adjusting quantity of intake gas into the engine in accordance with output signal of the aimed revolution speed control means and the correction quantity calculating means.

In the engine control device according to the present invention, the current value fluctuation removing means includes: smoothing means for smoothing generation current detected by the generation current detecting means, and fluctuation quantity determining means for determining whether fluctuation quantity of the generation current is below a predetermined quantity or not by comparing the smoothed current with the generation current, wherein when fluctuation quantity of the generation current is below the predetermined quantity, smoothed generation current is outputted, and when fluctuation quantity of the generation current is larger than the desired quantity, the generation current is outputted.

Further, the present invention provides an engine control device for controlling output power of an engine in accordance with an amount of the electric load to which a current is supplied from a generator driven by the engine, the engine control device comprising: generation current detecting means for detecting generation current of the generator; correction quantity calculating means for calculating a correction quantity of intake gas into the engine in accordance with the output signal of the generation current detecting means; aimed revolution speed control means for setting an aimed revolution number of the engine in accordance with information as to the engine and for calculating quantity of intake gas into the engine to control the revolutions of the engine to the aimed revolution speed; adjusting means for adjsting quantity of intake gas into the engine in accordance with output signal of the aimed revolution speed control means and the correction quantity calculating means; and correction prohibiting means for prohibiting correction of the quantity of intake gas into the engine when the generation current is below a desired value.

Further, the present invention provides an engine control device for controlling output power of an engine in accordance with an amount of the electric load to which a current is supplied from a generator driven by the engine, the engine control device comprising: generation current detecting means for detecting generation current of the generator; correction quantity calculating means for calculating a correction quantity of intake gas into the engine in accordance with output signal of the generation current detecting means; aimed revolution speed control means for setting an aimed revolution speed of the engine in accordance with information as to the engine and calculating the quantity of intake gas into the engine to control the revolutions of the engine to the aimed revolution speed; aimed revolution speed changing means for changing the aimed revolution speed in accordance with a result of comparison by comparing generation current with a predetermined value; and adjusting means for adjusting the quantity of intake gas into the engine in accordance with output of the aimed revolution number control means and the correction quantity calculating means.

Further, in the engine control device according to the present invention, the aimed revolution number changing means has a filter means for removing the fluctuation of generation current due to an intermittent load and the change of the aimed revolution number is determined in accordance with the output of the filter means.

In the engine control device according to the present invention, the changes of the output of the generation current detecting means are removed and the correction quantity of gas to be taken into an engine is calculated in accordance with fluctuation-removed generation current.

Further, in the engine control device according to the present invention, when the fluctuation quantity of the generation current is below a desired quantity, smoothed generation current is outputted, and when the fluctuation quantity of the generation current is larger than the desired value, the generation current is outputted.

Further, in the engine control device according to the present invention, when the generation current is below a desired value, correction of the quantity of gas to be taken into an engine is prohibited.

Furthermore, in the engine control device according to the present invention, an aimed revolution speed set in the aimed revolution speed control means is changed by a judgment whether the generation current is above a desired value or not.

Furthermore, in the engine control device according to the present invention, a change of an aimed revolution speed is determined in accordance with the output of the filter means so that the aimed revolution speed is not changed in accordance with an intermittent load.

DETAILED DESCRIPTION OF THE PREFERRED EMBODIMENTS

Hereinafter, an engine control device according to the present invention will be described with reference to the accompanying drawings.

Embodiment 1

Figure 1:
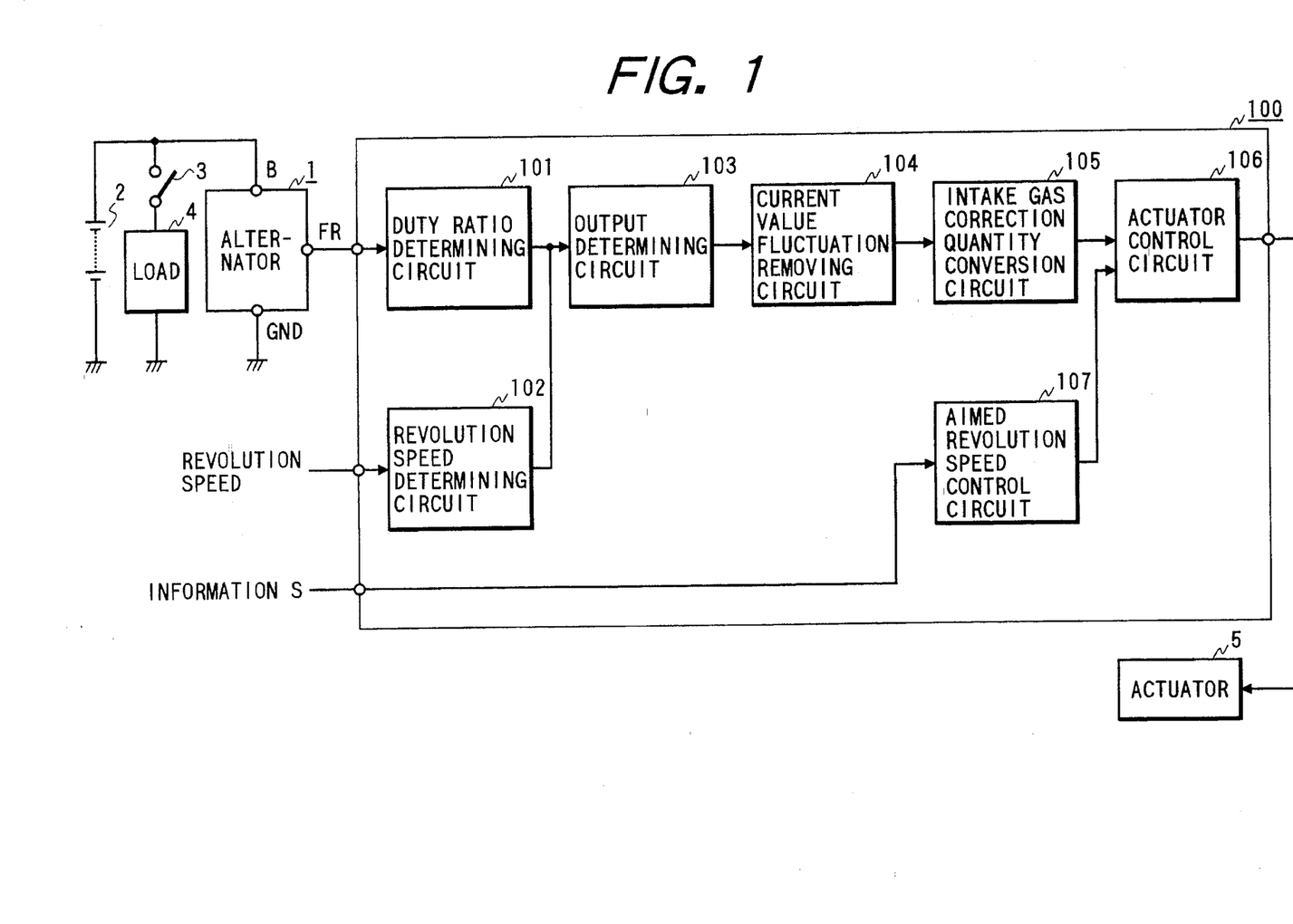
FIG. 1 is a block diagram illustrating a construction of the example 1 according to the present invention.
Figure 2:
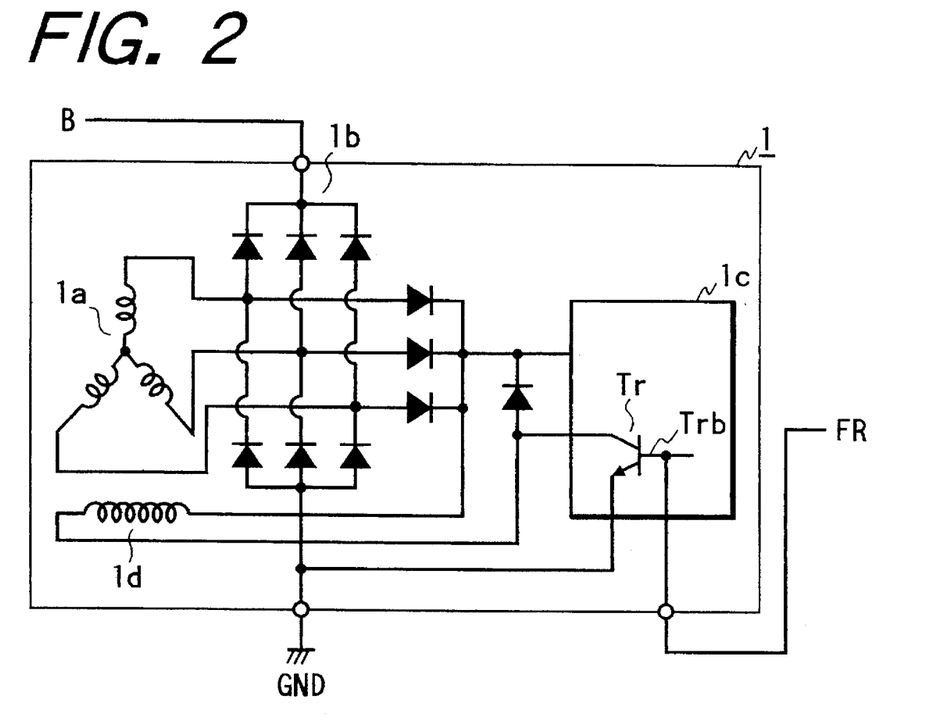
FIG. 2 is a constitutional view of an alternator.
Figure 3:
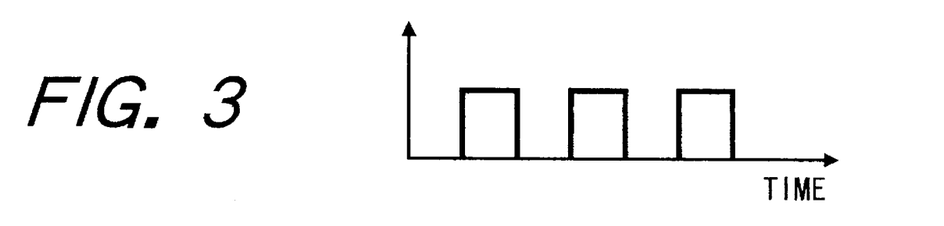
FIG. 3 is a signal diagram illustrating an example of a duty signal.
Figure 4:
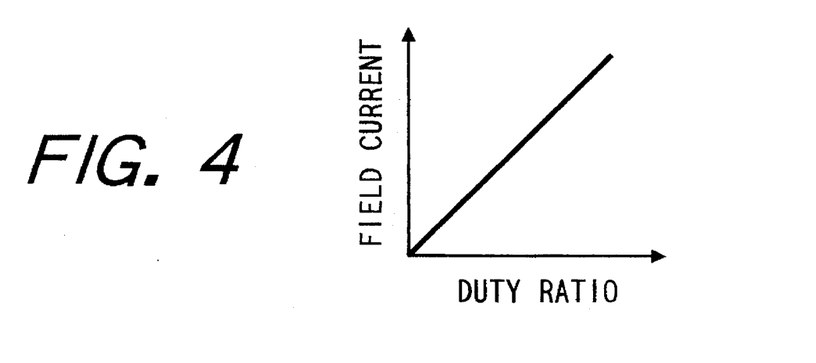
FIG. 4 is a characteristic diagram illustrating a relationship between the duty ratio and the field current.

FIG. 1 is a block diagram illustrating a construction of the example 1 according to the present invention. In FIG. 1, the reference numeral 1 designates an alternator operating as a generator which is rotated by an engine. The detail of the alternator is shown in FIG. 2. The reference 1a designates a stator coil which generates alternating voltage and the reference 1b designates a rectifier which rectifies the voltage generation in the stator coil 1a. The upper arm of the rectifier 1b is connected to a terminal B and the lower arm thereof is connected to a terminal ground. This terminal ground is grounded. The reference 1c designates an IC regulator interpolating a control transistor Tr which controls a field current flowing in a field coil 1d. The base of the control transistor Tr is connected to a terminal FR. The IC regulator 1c is ON/OFF controlled by the duty signal as shown in FIG. 3. The larger the duty ratio of the duty signal becomes, the greater the field current becomes. The relationship between the duty ratio and the field current is illustrated in FIG. 4.

Figure 5:
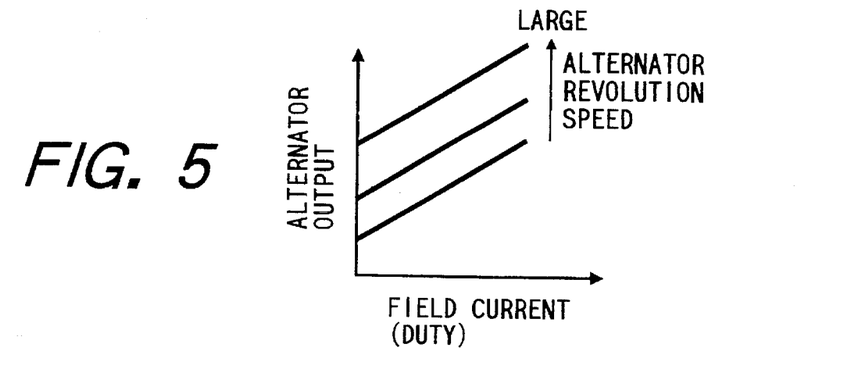
FIG. 5 is a characteristic diagram illustrating a relationship between the field current, the alternator revolution speed and the alternator generation current.

When the field current becomes great, the strength of the magnetic field which is formed by the field coil 1d becomes large. Accordingly, as shown in FIG. 5, the greater the field current becomes, the greater the output of the alternator 1 becomes. The output of the alternator 1 is also influenced by the revolution speed of the alternator 1. The revolution speed of the alternator can be obtained by a multiplication of the revolution speed of an engine with the pulley ratio. Namely, the larger the revolution speed of the alternator 1 becomes, the faster the magnetic field is changed, and accordingly, the output of the alternator becomes large.

In FIG. 1 again, the terminal B of the alternator 1 is connected to a battery 2 and a switch 3. The switch 3 is also connected to an electric load 4. Thus, the alternator 1 has the battery 2 and the electric load 4 as total quantity of the electric load. Although only one switch 3 and only one electric load 4 are shown in FIG. 1, a plurality of these actually exist.

The reference numeral 100 designates a controller which controls an actuator 5 for controlling the quantity of gas to be taken into the engine through a bypass in accordance with signals from the terminal FR of the alternator 1 and various information S. The actuator constitutes adjusting means for adjusting the quantity of gas which is taken into an engine. The reference numeral 101 designates a duty ratio determining circuit for determining a duty ratio of a field current, which receives signals from the terminal FR. Numeral 102 designates a revolution speed determining circuit for determining the revolution speed of the alternator, which receives signals from a revolution speed sensor (not shown). Numeral 103 designates an output determining circuit acting as a generation current detecting means for determining the generation current of the alternator in accordance with the map of FIG. 5, which receives signals of the duty ratio determining circuit 101 and the revolution speed determining circuit 102. Numeral 104 designates a current value fluctuation removing circuit acting as a current value fluctuation removing means for removing the fluctuation of an output of the output determining circuit. Numeral 105 designates an intake gas correction quantity changing circuit acting as a correction quantity calculating means for processing the correction quantity to correct the quantity of gas to be taken into the engine through a bypass by the quantity corresponding to the quantity of electric load (battery 2 and an electric load or current consumer 4) in accordance with the output of the current value fluctuation removing circuit 105. The correction quantity obtained in this circuit 105 is transferred to a downstream actuator control circuit 106.

The reference numeral 107 is an aimed (i.e., target) revolution speed control circuit acting as an aimed revolution speed control means for setting an aimed revolution speed for an idling in accordance with the information S such as the temperature of cooling water for an engine and calculating a feed back intake gas correction quantity with an actual revolution speed of the engine and the aimed revolution speed. The intake gas correction quantity calculated in the circuit 107 is transferred to the downstream actuator control circuit. The actuator control circuit 106 corrects an intake gas correction quantity calculated in the aimed revolution speed control circuit 107 with the correction quantity calculated in the intake gas correction quantity conversion circuit 105, drives the actuator in accordance with the results and controls the quantity of gas to be taken into the engine through a bypass which bypasses an intake tube to a desired quantity.

Figure 6:
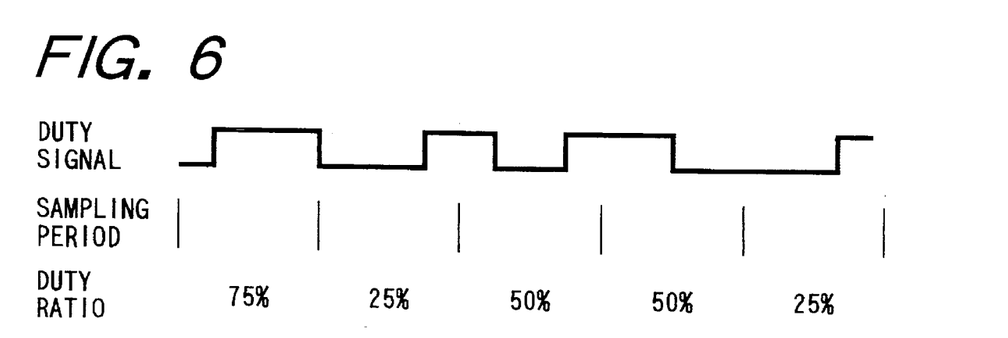
FIG. 6 is a time chart illustrating a duty ratio per every sampling period.

Next, the operation of this device will be described. The duty ratio determining circuit 101 determines a duty ratio in accordance with the duty signals from the terminal FR. This is illustrated in FIG. 6. The duty ratio is about 50% in average, but the duty ratios per every sampling period are differentiated respectively.

The output determining circuit 103 determines a generation current of the alternator 1 in accordance with a duty ratio determined by the duty ratio determining circuit 101 and a revolution speed determined by the revolution speed determining circuit. As described above, the duty ratio is fluctuated. Accordingly, the generation current value determined by the output determining circuit is fluctuated. The fluctuated generation current values are transferred to the current value fluctuation removing circuit 104.

Figure 7:
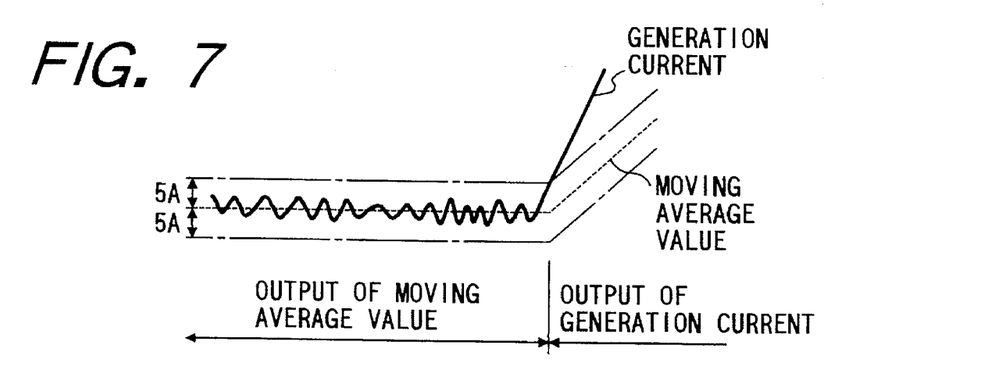
FIG. 7 is an explanatory view of the operation of a current value fluctuation removing circuit.

In the current value fluctuation removing circuit 104, the moving average value is calculated to remove the above-mentioned fluctuation and the generation current value is outputted as it was when the fluctuation of the generation current of the alternator 1 is over a predetermined value. The fluctuation is shown in FIG. 7. In FIG. 7, the continuous line is a generation current value determined by the output determining circuit, the broken line is a moving average value of a generation current, and phantom out lines are set values which determine whether the quantity of fluctuation of a generation current is below a desired quantity or not. The set values are set to +5 A and −5 A of the moving average values.

This solves the disadvantage that in the moving average value of the generation current, fluctuation in a steady state can be removed, but in a large fluctuation of the load quantity of electricity, the correction of the quantity of intake gas can not be followed.

Figure 8:
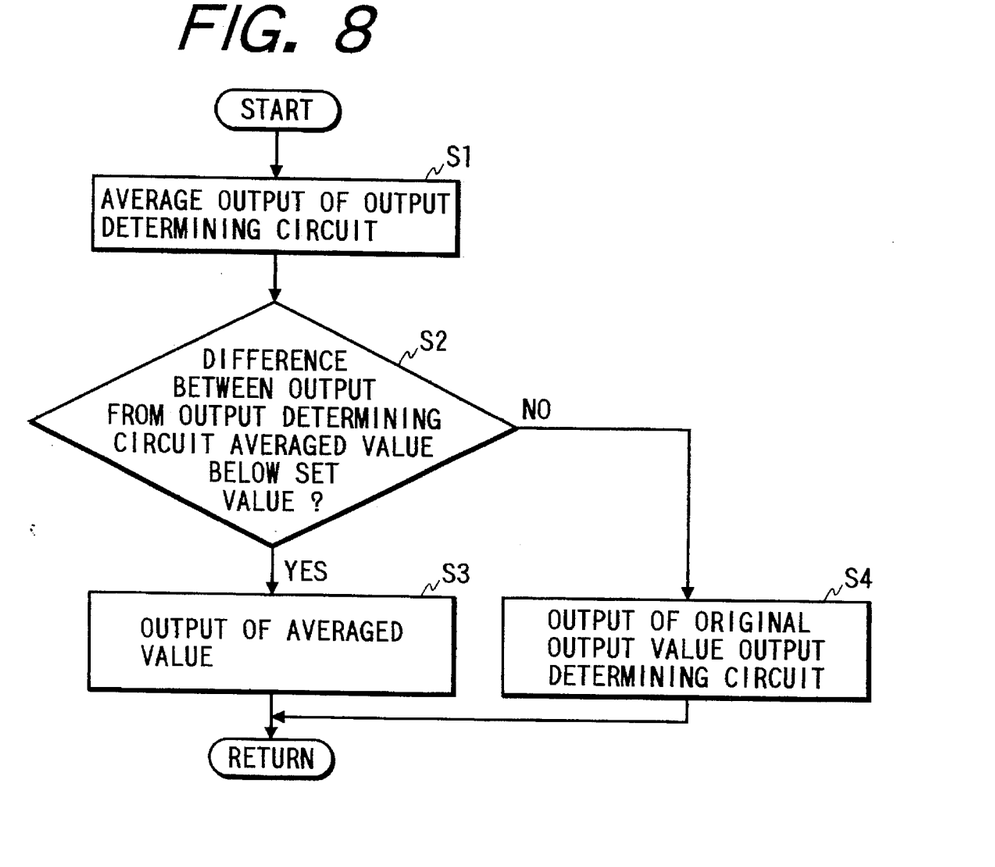
FIG. 8 is a flowchart illustrating the operation of a current value fluctuation removing circuit.

FIG. 8 illustrates a flowchart of an operation of the current value fluctuation removing circuit 104. In FIG. 8, the step S1 designates a smoothing means which averages the output of the output determining circuit 103. The averaging in this step may be the moving averaging mentioned above, or the arithmetic mean, or the integral. Thus, in this case, the output of the output determining circuit 103 may be smoothed. The step S2 is a fluctuation quantity determining means which compares the output from the output determining circuit 103 with an averaged value in the step S2, and determines whether the differences therebetween is larger than 5 A or not. When the difference is below 5 A, it is determined that a large fluctuation in the load quantity of electricity has not yet been carried out so that signals are transmitted to the step S3 and the current value fluctuation removing circuit 104 is outputted at the averaged value.

Accordingly, the fluctuation of the output of the output determining circuit 103 can be removed, the correction quantity which is calculated in the intake gas correction quantity converting circuit is not fluctuated every sampling period and the operation of the actuator 5 is stabilized. On the other hand, the difference is larger than 5 A, it is determined that a large fluctuation in the load quantity of electricity has been carried out so that signals are transmitted to the step S4 and the output from the output determining value 103 is outputted as it was. The intake gas correction quantity converting circuit 105 receives the output, the correction quantity of the intake gas corresponding to the fluctuation to correct the intake gas through a bypass promptly.

As described above, according to the embodiment 1, the hunting of revolutions of engine or the life reduction of actuator can be prevented by removing the fluctuation of the generation current value. Further, when the load quantity of the electricity has been largely fluctuated, the quantity of intake gas through a bypass is promptly corrected by the corresponding fluctuation so that the drop of revolution speed in idling, or the like can be prevented.

Embodiment 2

In the embodiment 2, the following problem can be solved. Namely, even if the drop of a battery voltage due to an external factor such as the drop of the temperature of a battery occurs, the output of the engine is increased by increasing a field current and increasing the quantity of intake gas by the corresponding quantity in spite of no supply of load by an operator. In this case, the operator has unnecessary worry. The above-mentioned problem is solved by prohibiting the correction of the quantity of intake gas corresponding to the load quantity of electricity under a condition below a current value of Io.

Figure 9:
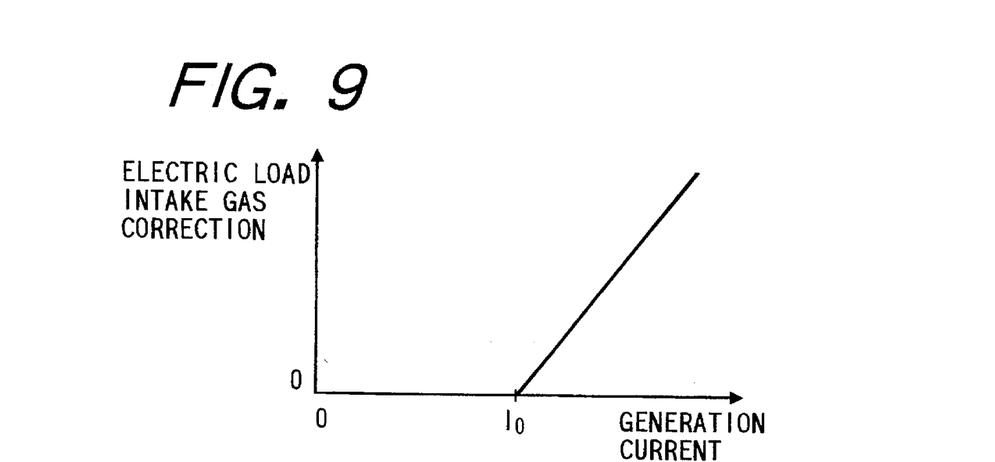
FIG. 9 is a characteristic diagram illustrating an example of a map which is used in the intake gas correction quantity fluctuation circuit.

This construction is substantially the same as that of the embodiment 1. The difference is only a map which is used in the intake gas correction quantity converting circuit 105. This map is shown in FIG. 9. The current value on the idling without an electric load (current consumer) is usually 7 to 10 A. On the other hand, the current value Io set to 14 A which is larger than the estimated range of fluctuation on the idling.

Therefore, when the voltage of the battery 2 has been dropped by an external factor for example, the alternator increases a field current to increase the generation current. However, the current value is not over 14 A. Accordingly the quantity of intake gas is not increased, and the output of engine is not also increased. In this case, the map forms a correction prohibiting means. Therefore, according to the embodiment 2, to give unnecessary worry to an operator is prevented. However, when the current value Io is too small, the above-mentioned problem can not be solved. On the other hand, when the current value Io is too large, a correction in a range where a correction is needed is prohibited. Therefore, while considering this point, an appropriate current value Io must be determined.

Embodiment 3

In the embodiment 3, an engine control device in which an idling up and an idling down are not repeated even by any driving state of engine can be obtained. In this case, the idling up or the idling down is to change an aimed revolution speed of engine during an idling if necessary.

Figure 10:
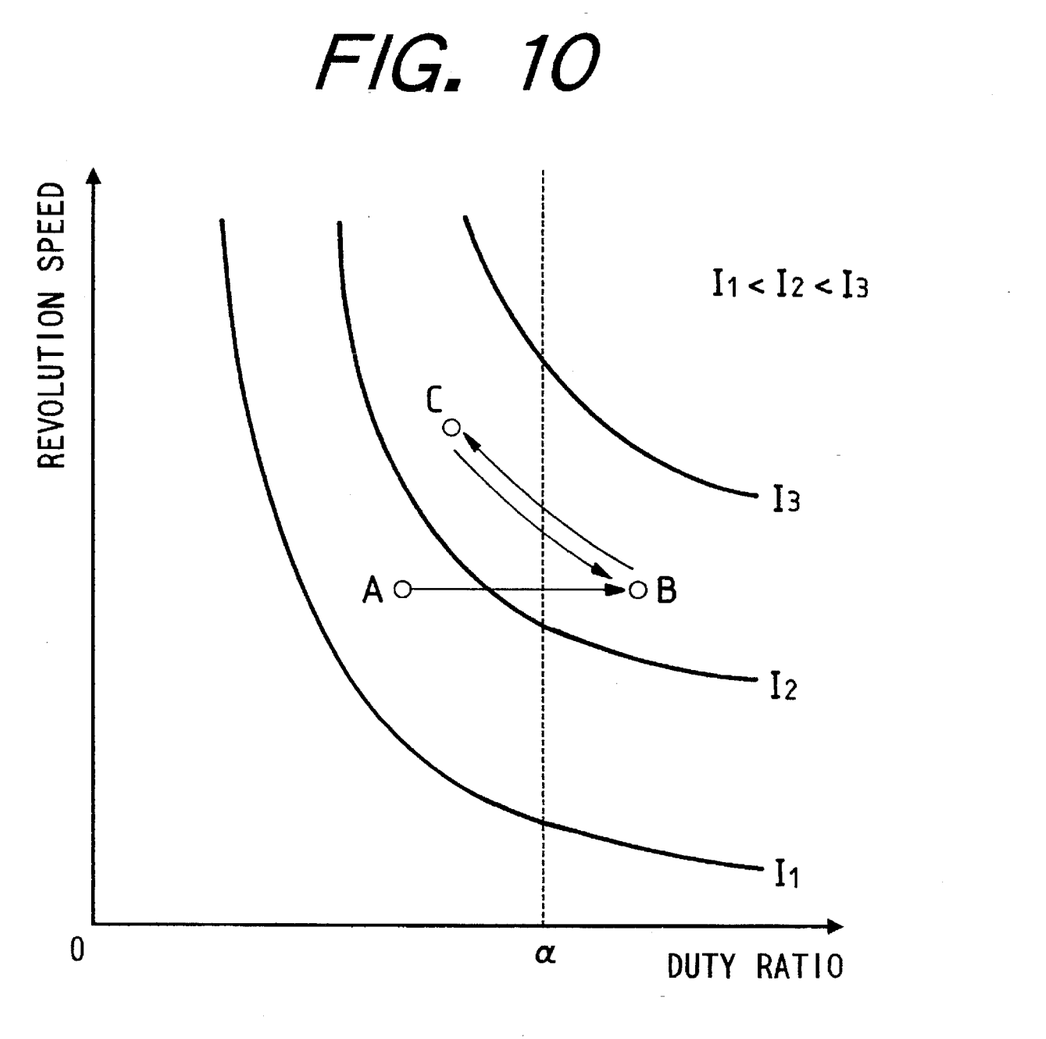
FIG. 10 is an explanatory view of the operation of an idle up determining circuit.

First, a case where the determination of the idling up and the idling down is made by using duty ratios will be described. As shown in FIG. 10, when the duty ratio is a certain level α or more, the aimed revolution speed of idling is set in a large number (idling up). On the other hand, when the duty ratio is smaller than α, the aimed revolution speed of idling is set in a small number (idling down).

Assuming that an operation has being operated in a state A in FIG. 10. When an electric load 4 such as air conditioner etc., is turned on in this state, the duty ratio of the field current is enlarged to compensate increased load (a state B). In this case, the duty ratio exceeds the certain level α. Therefore, an idling up is carried out and a revolution speed of engine is increased. When the revolution speed is increased, a necessary current can be obtained without supplying current so much so that the duty ratio is decreased (a state C). In this case, the duty ratio is below the certain level α. Thus, an idling down is carried out. Accordingly, to compensate the increased load, the duty ratio is increased (a state B). After that, the engine has the state B and the state C repeatedly so that an idling up and an idling down are repeated. In example 3, to determine the idling up or idling down, a current value I2 is used.

According to the embodiment 3, the electric load 4 of the air conditioner is increased. To compensate this, a duty ratio of a field current is enlarged to increase a generation current (a state B). In this case, the generation current of the alternator exceeds a desired current value I2 and an idling up is carried out. This idling up compensates the increase of the electric load 4 even though the duty ratio of the field current is decreased. Therefore the duty ratio is decreased (a state C). In this case where the state B is changed to the state C, the generation current is constant and does not cross the desired value I2. Therefore, according to example 3, an idling up and idling down are not repeated.

Figure 11:
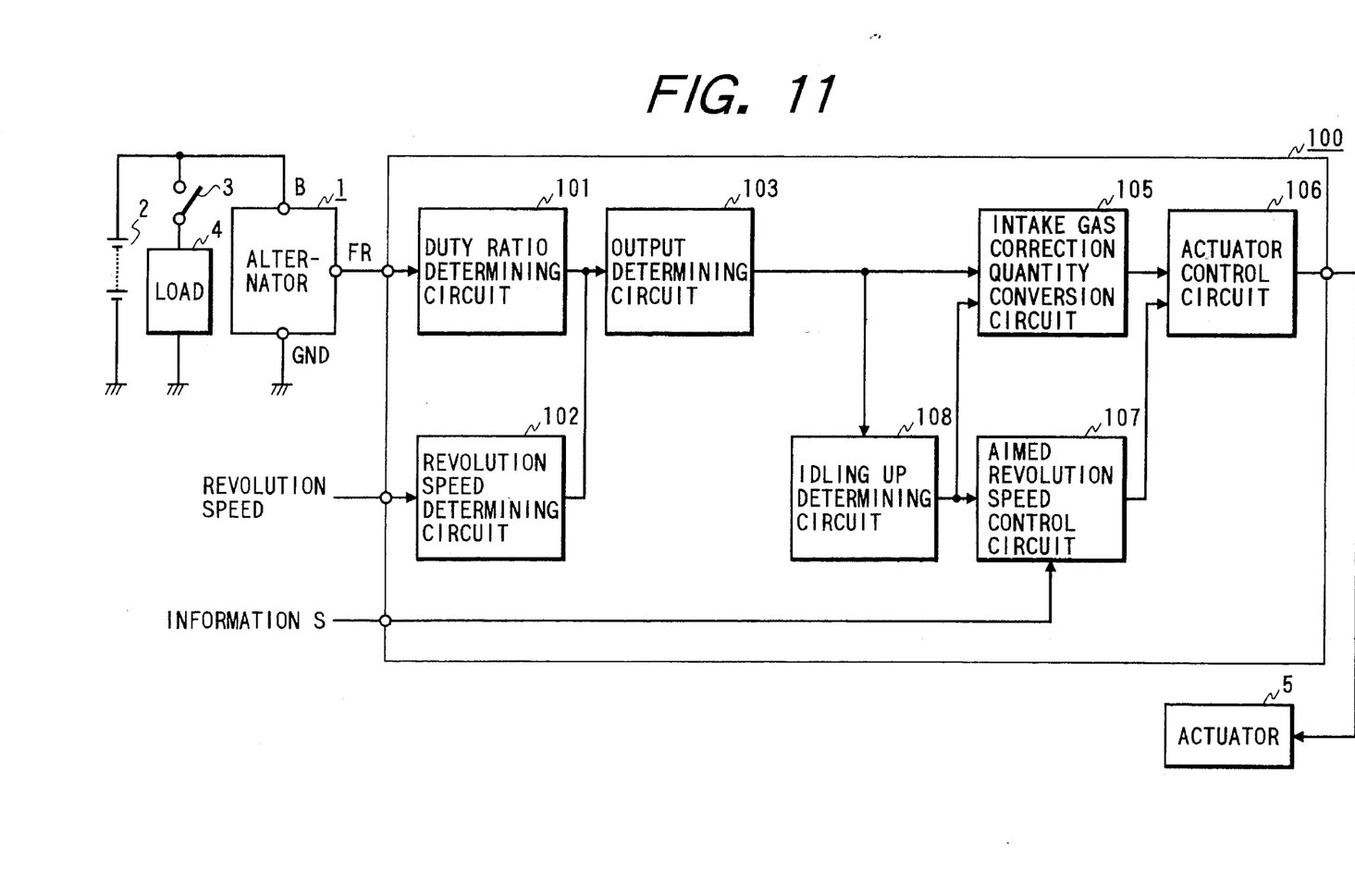
FIG. 11 is a block diagram illustrating a construction of the example 3 according to the present invention.

A construction of the embodiment 3 is illustrated in FIG. 11, in which the parts designated by the same reference numerals are the same as that described above or the like. In FIG. 11, the current value fluctuation removing circuit 104 shown in FIG. 1 is removed and the idling up determining circuit 108 is added. The reference numeral 108 designates an idling up determining circuit acting as an aimed revolution speed changing means for changing the aimed revolution speed by comparing a generation current value determined in the output determining circuit 103 with a predetermined desired value I2.

Namely, if a generation current value determined in the output determining circuit exceeds a desired value I2, an idling up is made by resetting the aimed revolution speed to a high level in the idling up determining circuit 108. If a generation current value is smaller than the desired value I2, an idling down is made by resetting the aimed revolution speed to a low level.

An aimed revolution speed control means 107 calculates a feedback gas intake correction quantity with an actual revolution speed of engine and the aimed revolution speed to control the actual speed thereof to the aimed revolution speed reset in the idling up determining circuit. Further, an intake gas correction quantity converting circuit 105 calculates correction quantity of intake gas in accordance with a load quantity of electricity after receiving outputs of the output determining circuit 103 and the idling up determining circuit 108.

An actuator control circuit 106 drives an actuator 5 by correcting a feedback intake gas correction quantity from an aimed revolution speed control circuit 107 with a correction quantity in the intake gas correction quantity converting circuit 105. Therefore, according to embodiment 3, deterioration of the control device can be prevented without repetition of the idling up and the idling down. The idling up in embodiment 3 is carried out in one stage. However, a plurality of desired values I1, I2 and I3 (I1<I2<I3) may be prepared as the idling up determining value so that the idling up is set in a multistage. Further, a non-stage continuous control in which an idling is carried out with a proportional relationship to the generation current. Thus, a more accurate and effective idling up control can be carried out. In embodiment 3, the current value fluctuation removing circuit 104 is removed, but it may be added if necessary.

Figure 12:
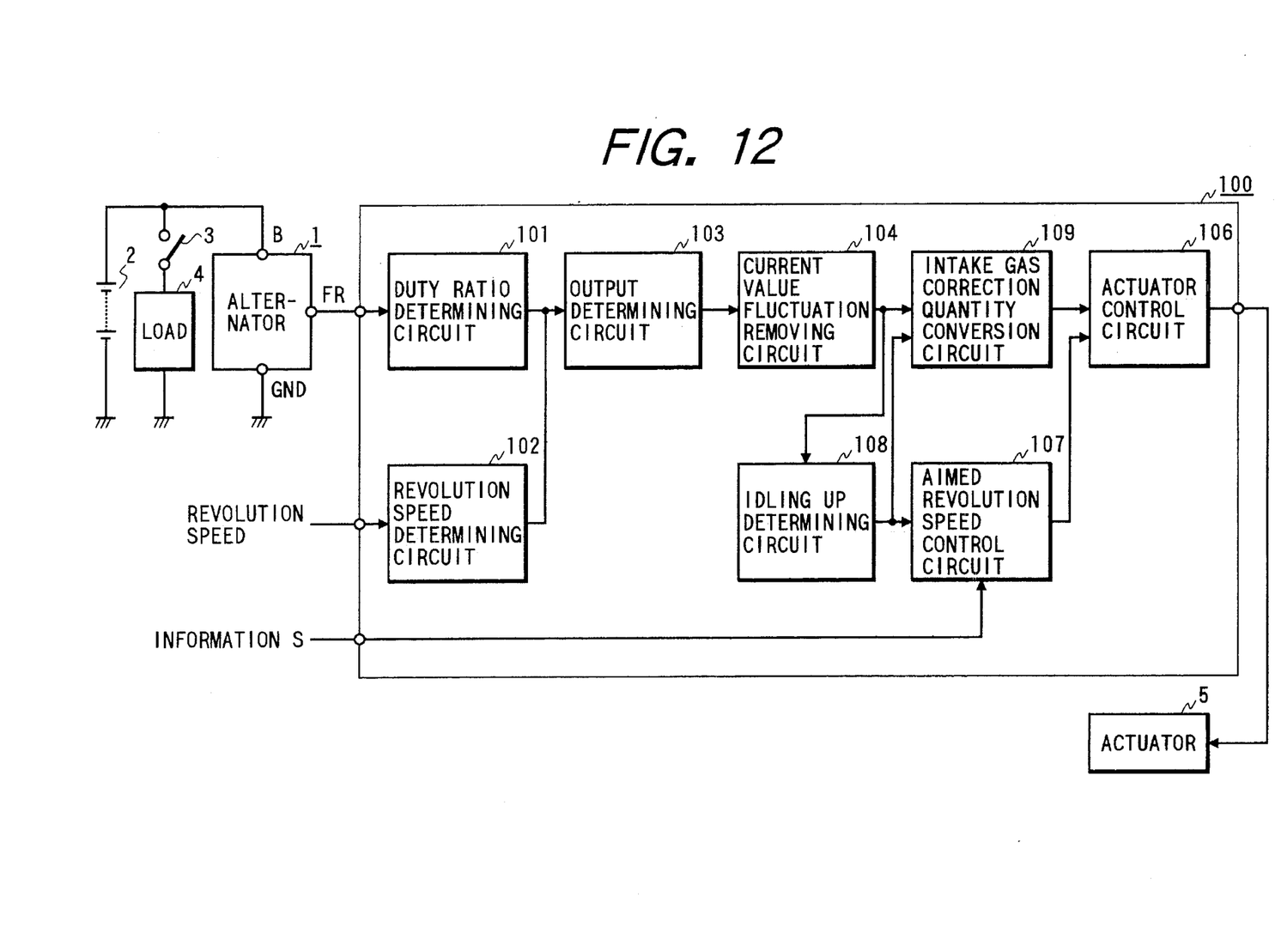
FIG. 12 is a block diagram illustrating a construction containing the examples 1 to 3 according to the present invention.

Further, as described in the embodiment 2, the map of the intake gas correction quantity converting circuit 105 may be changed. The construction is shown in FIG. 12. The reference numeral 109 designates an intake gas quantity correction circuit obtained by changing the intake gas correction quantity converting circuit 105 in the manner that the map is changed as shown in FIG. 9. The explanations of the operations of the circuit shown in FIG. 12 are omitted as the explanations are overlapped with that described above. In such construction, all modes of operations and effects of the embodiments 1 to 3 can be obtained.

Embodiment 4

In embodiment 4, the problem that an idling up and an idling down are carried out in accordance with the ON/OFF of intermittent load and the revolutions of engine become unstable, can be solved. To solve this problem, filter means is provided. In the embodiment 3, the repetitions of the idling up and idling down could be solved. However, in a case of intermittent loads such as wiper, winker, hazard light, passing or the like, a load quantity of electricity is fluctuated and the desired value I2 is crossed so that an idling up and idling down are sometimes repeated. Therefore, in an idling up determining circuit, a filter means is provided not so as to repeat the idling up and idling down in accordance with an intermittent load.

Figure 13:
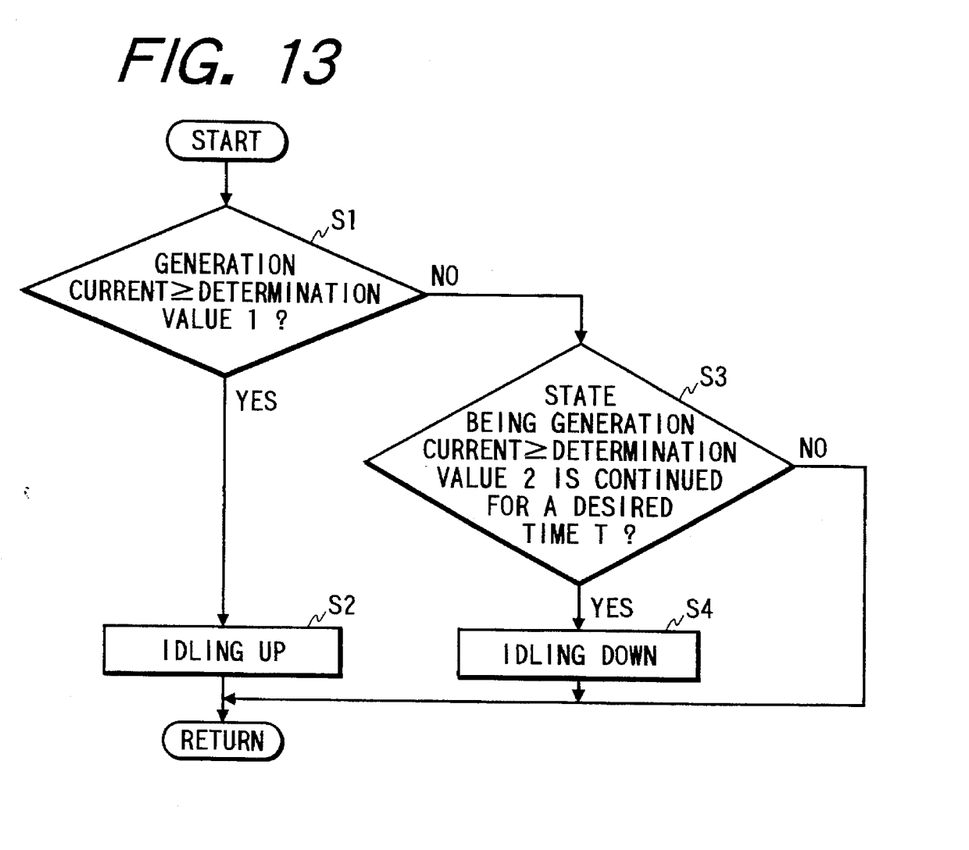
FIG. 13 is a flowchart illustrating the operation of an idle up determining circuit of the example 4 according to the present invention.
Figure 14:
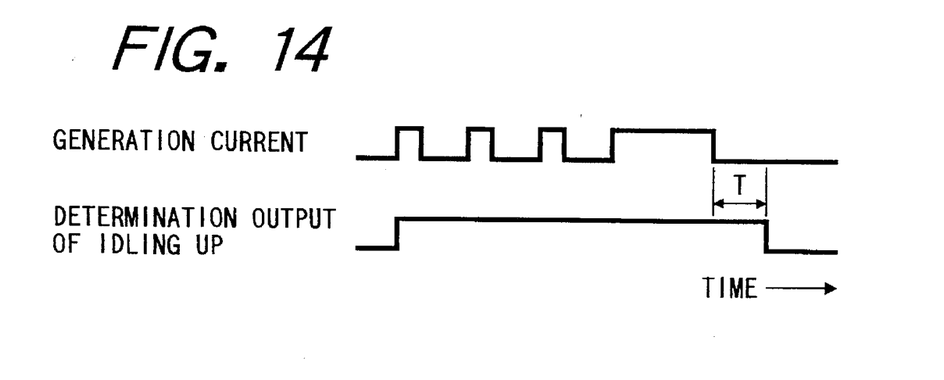
FIG. 14 is a time chart corresponding to the flowchart in FIG. 13.

FIG. 13 illustrates a flowchart of an operation of the idling up determining circuit of the embodiment 3 and FIG. 14 illustrates a time chart thereof. The flowchart shows the following operation. When the idling up is once carried out, the state of idling up is maintained unless the command of the idling down continues for a desired time T or more.

In step S1, it is determined whether or not a generation current is a determination value 1 or more. The determination value 1 is defined as a current value in the duty ratio of 90% in the idling. If the generation current becomes larger than the determination value 1 by a supply of an intermittent load, the signals is transmitted to step S2 and an idling up is synchronously carried out with the supply of the generation current.

Then, an intermittent load is turned on. At this time, the signal is determined as N in step S1 and transmitted to step S3. In step S3, it is determined whether or not the generation current having a state where a determination value is smaller than 2 (a current value in the duty ratio of 70% in the idling) was continued for a desired time T. The desired time T is set for time longer than the period for the intermittent load. Therefore, even though the generation current has a determination value smaller than 2 after the supply of intermittent load, the state is not continued for the desired time T or more. Accordingly, the signal is determined as N in step S3 and the processing is ended while keeping the state. After that, when the intermittent load is turned off, a state where the generation current is lower than the determination value 2 is continued for the desired time T. Thus, the signal is determined as Y in step S3. Then, after the desired time T has passed, the signal is transmitted to step S4 and the idling down is carried out.

Accordingly, when the intermittent load is turned on, the state of idling up is maintained till the intermittent load is turned off, and unnecessary repetition of the idling up and idling down is prevented. In this example, the flowchart of FIG. 13 constructs a filter means.

Figure 15:
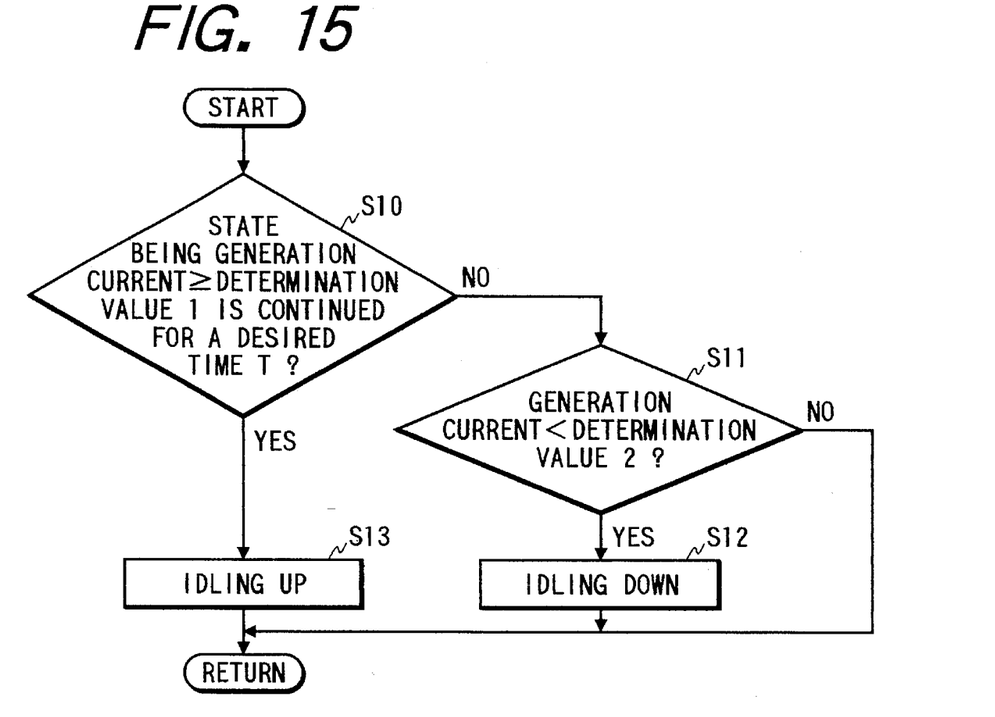
FIG. 15 is a flowchart illustrating another operation of an idle up determining circuit of the example 4 according to the present invention.
Figure 16:
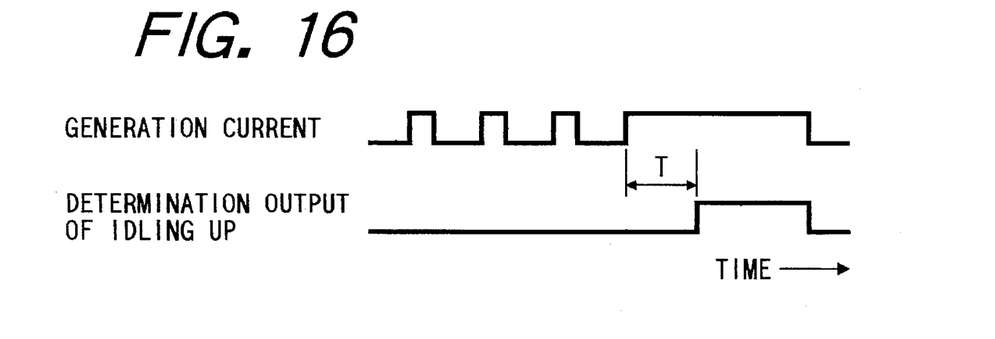
FIG. 16 is a time chart corresponding to the flowchart in FIG. 15.
Figure 17:
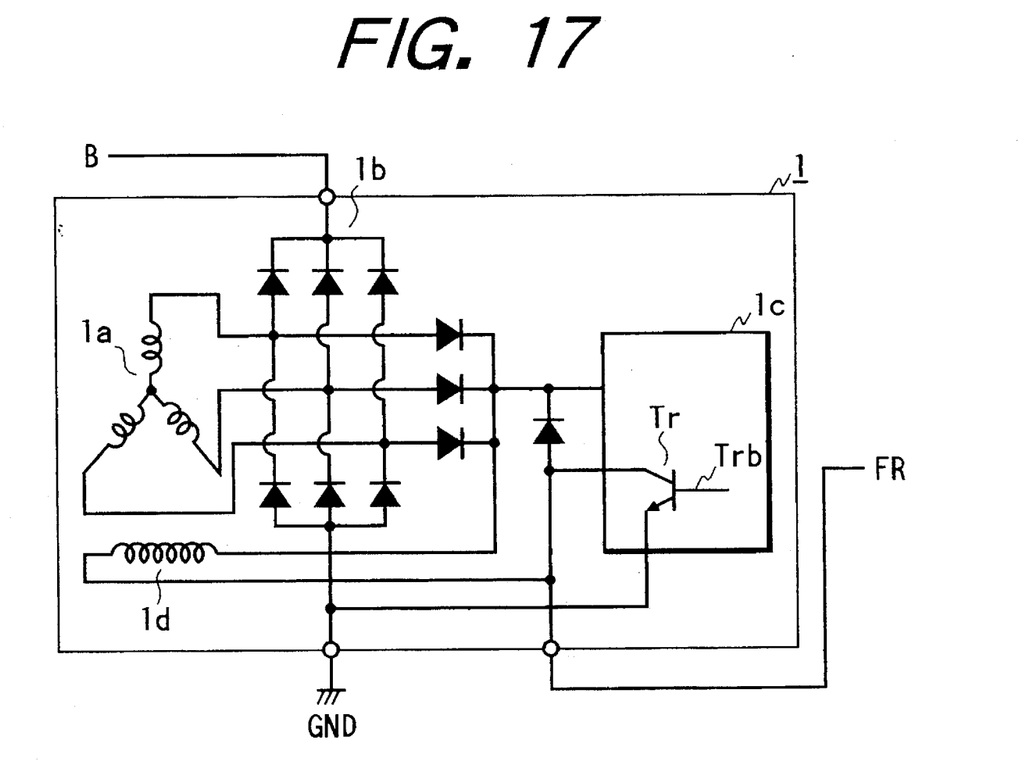
FIG. 17 is a constitutional view illustrating an example of an alternator which can be applied to the present invention.

The filter means of FIG. 13 may be changed to that of the flowchart illustrated in FIG. 15. FIG. 15 is a flowchart illustrating an operation of an idling up determining circuit, and FIG. 16 is a time chart thereof. In FIGS. 15 and 16, the determination values 1 and 2 and the desired time T are the same as in FIG. 13.

The flowchart of FIG. 15 is constructed not so as to carry out the idling up for the intermittent load. In step S10, it is determined whether or not, a state where a generation value has the determination value of 1 or more has been continued. Since the desired time T is set for time longer than the period for the intermittent load, in this case, the signal is determined as N and transmitted to step S11. In step 11, it is determined whether or not the generation current has a determination value smaller than 2. If the generation current has a determination value smaller than 2 in step S11, an idling down is carried out. On the other hand, if the generation current has a determination value 2 or more, the processing is ended keeping the state.

Suppose a large electric load 4, for example, air conditioner etc., has been turned on. In this case, the generation current has a determination value larger than 1 and the state is continued for a desired time T or more. In step S10, when this state is continued for a desired time T, the signal is determined as Y and transmitted to step S13 to carry out an idling up.

Therefore, when the flowchart of FIG. 15 is used instead of the flowchart of the idling up determining circuit shown in FIG. 13, an idling up is not carried out for the intermittent load. On the other hand, if the idling up is required, the idling up is reliably carried out. Accordingly, the revolution speed of engine is not increased without necessity and the fuel cost can be improved. The filter means of the embodiment 4 can be used in the idling up determining circuit shown in FIG. 12, with the result that the mode of operations and the effects obtained in the embodiments 1 to 4 can be obtained. The above-mentioned examples were explained by using the alternator shown in FIG. 2. However, an alternator in which the duty signals are directly obtained from a field coil may be used. If an alternator in which the duty ratio of the field coil is outputted is used, the same mode of operations and effects can be obtained.

Further, as an actuator which controls the quantity of intake gas of engine, a stepping motor, a solenoid valve or a linear solenoid valve etc., may be used. In the above described embodiments, the control of quantity of intake gas for a bypass which bypasses a throttle valve were explained. However, the embodiment is not limited to that and a control in which a throttle valve is directly driven and a quantity of intake gas can be also used.

As described above, according to the engine control device for engine, the fluctuation of the generation current detecting means is removed and the quantity of intake gas into an engine is calculated in accordance with the generation current in which the fluctuation was removed. Therefore, the hunting in revolution speed of engine, or the reduction of life of the actuator can be prevented.

Further, according to the engine control device of this invention, when the fluctuated quantity of generation current is below a desired value, a smoothed generation current is outputted. On the other hand, when the fluctuated quantity of generation current is larger than the desired value, a detected generation current is outputted as it was. Accordingly, a hunting in the revolution speed of engine, which is derived from the fluctuation of the duty ratio or a reduction of life of the actuator can be prevented. Additionally, a large fluctuation of the load quantity of electricity can be promptly treated.

Further, according to the engine control device of this invention, when the generation current value is below a desired value, a correction of the quantity of intake gas into an engine is prohibited. Accordingly, the problem that the increase in the output of engine gives unnecessary worry to an operator in spite of no supply of an electric load by the operator does not occur.

Further, according to the engine control device of this invention, by changing the aimed revolution speed which is determined in the aimed revolution speed control means by confirming whether or not the generation current value became a desired value or more, the repetition of idling up or idling down can be prevented.

Further, according to the engine control device of this invention, by determination of the change in the aimed revolution speed, the fact that the aimed revolution speed is changed in accordance with intermittent load can be prevented.

What is claimed is:
1. An engine control device for controlling output power of an engine in accordance with an amount of the electric load to which a current is supplied from a generator driven by said engine, said engine control device comprising:
   generation current detecting means for detecting generation current of the generator from a duty ratio of a field current of said generator and from a revolution speed of the engine;
   current value fluctuation removing means for removing a fluctuation from an output signal of said generation current detecting means, said current value fluctuation removing means including: smoothing means for smoothing generation current detected by said generation current detecting means; and fluctuation quantity determining means for determining whether an amount of fluctuation of said generation current is below a predetermined quantity or not by comparing said smoothed current with said generation current, wherein when the amount of fluctuation of said generation current is below the predetermined quantity, smoothed generation current is provided as an output signal of said current value fluctuation removing means, and when the amount of fluctuation of said generation current is larger than the predetermined quantity, said generation current is provided as the output signal of said current value fluctuation removing means;

correction quantity calculation means for calculating a correction quantity of intake gas into said engine in accordance with the output signal of the current value fluctuation removing means;

target revolution speed control means for setting a target revolution speed of said engine and for calculating a quantity of intake gas into said engine to maintain the revolution speed of said engine at the target revolution speed; and adjusting means for adjusting a quantity of intake gas into said engine in accordance with an output signal of said target revolution speed control means and said correction quantity calculating means.

2. An engine control device for controlling output power of an engine in accordance with an amount of the electric load to which a current is supplied from a generator driven by said engine, said engine control device comprising:

generation current detecting means for detecting generation current of the generator from a duty ratio of a field current of the generator and from a revolution speed of the engine;

correction quantity calculating means for calculating a correction quantity of intake gas into said engine in accordance with the output signal of the generation current detecting means;

target revolution speed control means for setting a target revolution speed of said engine and for calculating a quantity of intake gas into said engine to maintain the revolution speed of said engine at the target revolution speed;

adjusting means for adjusting the quantity of intake gas into said engine in accordance with an output signal of said target revolution speed control means and said correction quantity calculating means; and correction prohibiting means for prohibiting correction of the quantity of intake gas into said engine when said generation current is below a desired value.

3. An engine control device for controlling output power of an engine in accordance with an amount of the electric load to which a current is supplied from a generator driven by said engine, said engine control device comprising:

generation current detecting means for detecting generation current of the generator from a duty ratio of a field current of the generator and from a revolution speed of the engine;

correction quantity calculating means for calculating a correction quantity of intake gas into said engine in accordance with an output signal of the generation current detecting means;

target revolution speed control means for setting a target revolution speed of said engine and for calculating a quantity of intake gas into said engine to maintain the revolution speed of said engine at the target revolution speed;

target revolution speed changing means for changing said target revolution speed in accordance with a result of comparison by comparing the generation current with a predetermined value; and adjusting means for adjusting the quantity of intake gas into said engine in accordance with an output of the target revolution speed control means and the correction quantity calculating means.

4. An engine control device according to claim 3, wherein said target revolution speed changing means has a filter means for removing the fluctuation of generation current due to an intermittent load and the change of the target revolution speed is determined in accordance with the output of the filter means.

* * * * *